United States Patent Office 3,491,074
Patented Jan. 20, 1970

3,491,074
PROCESS FOR PREPARING ALFIN CATALYSTS AND SODIUM DISPERSIONS FOR USE IN MAKING THE SAME
Lowell D. Grinninger and Harry Greenberg, Cincinnati, Ohio, assignors to National Distillers and Chemical Corporation, New York, N.Y., a corporation of Virginia
No Drawing. Filed Aug. 21, 1967, Ser. No. 661,800
Int. Cl. C08f 1/28; C08d 1/14
U.S. Cl. 260—82.1
18 Claims

ABSTRACT OF THE DISCLOSURE

A process is provided for the preparation of novel alfin catalysts by reaction of methyl n-alkyl carbinol, sodium, alkyl halide, and an olefin, employing as the source of sodium metal a dispersion of sodium in an inert diluent and containing from at least 1% to about 5% aluminum distearate by weight of the sodium. Sodium dispersions in an inert diluent containing at least 2.5% aluminum distearate also are provided, especially useful in preparing such alfin catalysts.

A process also is provided for preparing alfin polymers using such alfin catalysts.

This invention relates to a process for preparing alfin catalysts, using aluminum distearate, and more particularly to a process for preparing in the presence of aluminum distearate the sodium dispersion that is used in the preparation of alfin catalysts, and to alfin catalysts and sodium dispersions useful in their preparation having improved activity due to the presence during preparation thereof of an increased amount of aluminum distearate, and to a process for preparing alfin polymers using such alfin catalysts.

Morton and coworkers in a series of papers in the Journal of the American Chemical Society, starting in 1947, describe an organoalkali metal catalyst for the polymerization of olefins and particularly dienes which they term an alfin catalyst, Journal of the American Chemical Society 69 161; 167; 950; 1675; 2224 (1947). The name alfin is taken from the use of an *al*cohol and an ole*fin* in their preparation. The alcohol, a methyl n-alkyl carbinol, usually isopropanol, in the form of the sodium salt, and the olefin, also in the form of the sodium salt, together with sodium chlorine, form a complex that constitutes the catalyst.

These catalysts are reported by Morton et al. to cause the polymerization of butadiene, isoprene and other dienes, alone and together with other copolymerizable organic compounds, in most cases diolefinic in nature. The catalyst was discovered in the course of a study of the addition of organosodium compounds to dienes. Later on, Morton summarized the work done up until 1950 in Industrial and Engineering Chemistry, 42 1488–1496 (1950).

The polymers obtained using alfin catalysts are termed alfin polymers or alfin rubbers. Because of the speed and ease of the reaction, these attracted considerable interest in the 1940's and early 1950's. However, the very speed of the reaction led to problems. The alfin rubbers have the disadvantage of having an extremely high molecular weight, generally in excess of 3,000,000, and frequently in excess of 10,000,00. As a result, although these polymers are generally gel-free and have high tensile strength, superior abrasion resistance, and tear strength, they are also very tough, and exhibit little breakdown and consequently poor banding on the bill. Therefore, they are difficult if not impossible to process using conventional equipment. Consequently, interest and research in the alfin rubbers until recently was minimal, and in their original form the alfin rubbers have found very little commercial application.

Pfau et al. U.S. Patent Nos. 2,964,83, granted Dec. 13, 1960, and 3,074,902, granted Jan. 22, 1963, endeavored to reduce the working viscosity of the alfin polymers by the incorporation of liquid plasticizers, particularly petroleum hydrocarbon oils. The resulting products were indicated to be particularly useful in the manufacture of tire treads.

For the first time, alfin rubbers of relatively low and medium molecular weight ranging from about 50,000 to about 1,250,000 were described by Greenberg et al. U.S. Patents Nos. 3,067,187, granted Dec. 4,1962, and 3,223,-691, granted Dec. 14, 1965. This control of molecular weight was made possible by incorporation of a molecular weight modifier, a dihydro aromatic compound, with the alfin catalyst during the polymerization. As a result, commercial interest in the alfin polymers has been renewed, and with it interest in large-scale preparation of alfin catalysts.

Morton describes the preparation of the catalyst used in the alfin rubber process. Amylsodium is prepared from amylchloride by reaction with sodium metal. Alcohol is added to react half or more of the amylsodium, thereby furnishing the alkoxide in a finely-divided state. Propylene is then passed into the mixture. All operations are carried out in a high speed stirring apparatus, under an atmosphere of dry nitrogen. Half of the product is sodium chloride, which remains with the catalyst. From some preparations, gentle centrifuging or decanting will throw out first the traces of sodium metal left by failure of the first step, formation of amylsodium, to proceed 100%, and secondly, the small amount of blue sodium chloride that often accompanies the reaction. The remainder is the mixture of catalyst and sodium chloride that remains suspended indefinitely. In general, the alkoxide must be derived from a secondary alcohol, one branch of which is a methyl group, and the olefin must have the essential system —CH=CHCH$_2$—, preferably a terminal olefin,

$$CH_2=CHCH_2-$$

Greenberg et al. U.S. Patent Nos. 3,067,187 and 3,223,-691 describe the preparation of alfin catalysts using dry commercial hexane as the solvent. Finely-divided sodium dispersed in alkylate was added to the hexane. The slurry was cooled to −10° C., and the dry n-amyl chloride then added, with moderate stirring, which was continued for one hour after the addition has been completed. Then, isopropyl alcohol was added, with additional stirring, and finally, dry propylene was introduced into the mixture, maintaining the temperature all the while at −10° C. until active reflux of the propylene occurred. The temperature was then raised gradually to 25° C., the propylene allowed to leave the system, and the reaction slurry transferred to a storage vessel under argon, where it was diluted with dry hexane, and was then ready for use in the preparation of alfin rubbers.

The preparation of the sodium slurry in an inert diluent employed in the reaction represents an important aspect of the catalyst preparation. Greenberg et al. point out that a particularly effective alfin catalyst is obtained when the sodium is employed as a finely-divided dispersion in the inert diluent and suggest a dispersion in which the sodium maximum average particle size can vary from 1 to 10 microns, such as may be prepared on a Gaulin mill. Greenberg et al. comment that when such finely-divided sodium is used, ordinary stirring devices may be employed, instead of high speed comminuting equipment, in the preparation of the catalyst. A 100% yield of amylsodium and subsequent quantitative yields of sodium isopropoxide and allylsodium are obtainable, and the alfin catalyst and end products of the polymerization are then free of metallic sodium contamination. Moreover, catalyst activity can be more readily reproduced.

In accordance with the instant invention, the sodium dispersion employed in the preparation of an alfin catalyst and the resulting alfin catalyst are each improved by preparing the sodium dispersion in the presence of at least 1% and preferably at least 2.5% aluminum distearate by weight of the sodium present. If aluminum distearate is present in this amount during dispersion of the sodium in the inert diluent, and remains in the alfin catalyst prepared therefrom, an alfin catalyst of enhanced activity is obtained.

The invention also provides sodium dispersions in an inert diluent containing aluminum distearate in an amount of at least 2.5% based on the amount of sodium present, as well as alfin catalysts having an enhanced activity due to their content of aluminum distearate and/or a sodium-containing reaction product thereof.

The invention also provides an improved process for preparing alfin polymers, which comprises polymerizing an unsaturated organic compound in the presence of an alfin catalyst which contains aluminum distearate and/or a sodium-containing reaction product thereof in an amount of at least 1% by weight and preferably at least 2.5% based on the sodium content of the catalyst.

The function of the aluminum distearate in these compositions is not fully understood. It almost certainly reacts with the sodium in situ, and the sodium reaction product may be responsible for the enhanced effectiveness of the alfin catalyst prepared therefrom. Aluminum distearate or the reaction products therefrom must be present in the finished alfin catalyst in an amount of at least 1% and preferably at least 2.5% for the enhanced activity, but it need not be present during dispersion of the sodium, provided it is added to and reacted with the sodium before the sodium dispersion is used to form the alfin catalyst.

The effectivness of aluminum distearate in this proportion is quite remarkable, in view of the fact that other metal stearates are not effective. Furthermore, it appears that the effectiveness of the aluminum distearate in enhancing the alfin catalyst activity is not evidenced solely by its presence during the dispersion of the sodium in the diluent; aluminum distearate or reaction product must also be present in the finished catalyst, during the polymerzation of the olefin used in preparing the alfin rubber.

The proportion of aluminum distearate to sodium in the dispersion is of major importance. It has been found that less than about 1% aluminum distearate by weight of the sodium is not sufficient to yield a sodium dispersion which will consistently give an enhanced strength alfin catalyst. Accordingly, the proportion of aluminum distearate to sodium in the dispersion should be at least 1% and preferably at least 2.5% by weight of the sodium. Moreover, the amounts of aluminum distearate in excess of about 5% by weight of the sodium, the dispersion may thicken excessively, and become difficult to pump, but alfin catalyst activity is not affected. Moreover, sodium present may be unduly consumed by reaction with aluminum distearate.

The amount of sodium in the dispersion is not critical, and can be adjusted to suit any alfin catalyst preparatory procedure that is desired. Usually, a sodium concentration within the range from about 20 to about 50% is satisfactory.

The inert diluent that is employed for dispersion of the sodium can be any liquid aliphatic or cycloaliphatic saturated hydrocarbon. The hydrocarbon should be a liquid under the conditions during which the sodium dispersion and the alfin catalyst are formed. This requires that a diluent be selected that remains liquid at temperatures as low as −20° C. and below, and at temperatures as high as 150° C. (even though pressure equipment must be utilized), the maximum temperature normally reached during sodium dispersion formation.

The satisfactory aliphatic hydrocarbon diluents include pentane, hexane, heptane, octane, nonane and decane, as well as commercialy available solvent mixtures including any of these hydrocarbons, as well as Isopar C, a mixture of isoparaffins containing 70–80% 2,2,4-trimethyl pentane, and homologues thereof of Sinclair's Light Alkylate having the composition;

| Component: | Weight percent |
|---|---|
| 2-methylbutane | 10.0 |
| 2,3-dimethylbutane | 8.2 |
| 2,4-dimethylpentane | 5.8 |
| 2,3-dimethylpentane | 7.9 |
| 2,2,4-trimethylpentane | 21.5 |
| 18 other $C_8$ and $C_9$ branched aliphatic hydrocarbons | 46.6 |
| | 100.0 |

Isopar E, and 2,2,4-trimethylpentane, also useful are cycloaliphatic hydrocarbons, such as cyclohexane, cyclopentane, methyl cyclohexane, cycloheptane, cyclooctane, etc.

As indicated in Greenberg et al. Patents Nos. 3,067,187 and 3,223,691, finely-divided sodium dispersions having a maximum average particle size of about 1 to 10 microns are prepared in a Gaulin mill. Such mills are well known, and form no part of the instant invention. Aluminum distearate is a dry powder, insoluble in the cold and slightly soluble in the hot hydrocarbon diluent. It can be sufficiently finely-divided during milling so that it will form a stable collodial suspension in the hydrocarbon upon heating, during dispersion of the sodium.

It is usually preferable to blend the aluminum distearate with the diluent employed, and run this into the heated mixing apparatus, such as the Gaulin mill. Sodium metal is then added. The system must be placed under an inert gas, such as nitrogen, argon or helium, during the dispersion. The diluent is brought to a temperature at which the metallic sodium liquefies, and milling is then begun, to reduce the molten sodium to a small particle size. As the sodium is dispersed, so also is the aluminum distearate. The finished dispersion is then stored under nitrogen or other inert gas to preserve its activity. When prepared properly, the dispersion is stable for two weeks or more.

It is believed that in the course of the dispersion preparation, aluminum distearate reacts with the sodium. One atom of sodium can react with each OH group in the stearic acid, giving a total of five equivalents of sodium per mole of aluminum distearate. Since the sodium that is employed in the preparation of the alfin catalyst must, of course, be free metal, so as to react with the amyl chloride or other alkyl chloride, enough sodium metal is added in the formation of the sodium dispersion to provide the amount stoichiometrically required in the formation of the alfin catalyst, over and above the amount that reacts with the aluminum distearate present. Thus, for a dispersion using 18.2 grams of distearate for one pound of sodium, 0.15 atom of sodium is consumed by the distearate out of the total of 19.8 sodium equivalents in the one pound charge. Thus, 99.2 is the free sodium value for this charge.

It will, of course, be apparent that any milling or homogenizing equipment can be used in dispersion of the sodium in the inert diluent. It is generally preferred that the equipment be capable of dispersing the sodium in the diluent to an average particle size within the range from about 0.5 to about 100 microns. The temperature employed during the dispersion must be above the melting point of sodium, and, because sodium melts at 97.6° C., temperatures within the range of from about 100 to 120° C. are suitable. It is preferred to work at a temperature above 110° C. Excessively high temperatures are not desirable, because of the danger involved in handling sodium at high temperatures in the presence of hydrocarbon solvents.

It is not necessary that all of the aluminum distearate employed in the sodium dispersion be present at the time of dispersion of the sodium. Additional aluminum distearate can be added to the sodium dispersion after its formation, but prior to preparation of the alfin catalyst therewith. When such additional aluminum distearate is added, however, it is important that the dispersion be heated to a temperature of at least 100° C. for a few minutes, before proceeding with alfin catalyst preparation.

The aluminum distearate-containing sodium dispersion in an inert diluent can be employed in the usual way in any desired preparation of alfin catalyst. One typical method of preparation of an alfin catalyst has been described above, and is described in sufficient detail in the Greenberg et al. Patent Nos. 3,067,187 and 3,223,691 and in the Morton articles supra, so that full details are not required here, and those skilled in the art will know from the following description how to utilize sodium dispersions in accordance with the invention in such preparations.

As the alcohol component, used to form the sodium alkoxide, any methyl n-alkyl carbinol having from one to about ten carbon atoms can be used, such as isopropanol, methyl-n-propyl carbinol, and methyl-n-butyl carbinol. Isopropanol is preferred.

The alkoxide will form at rather low temperatures, as low as −20° C. being satisfactory. There is no upper limit on reaction temperature.

The olefin has from about three to about ten carbon atoms, and should contain the group —CH=CH—CH$_2$—. Propylene is preferred, giving allyl sodium, but butene-1, butene-2, pentene-1, hexene-1, etc. can also be used. Terminal olefins CH$_2$=CH—CH$_2$— are preferred. Activity may decrease as the olefin molecular weight increases.

The alkenyl sodium, sodium halide and sodium alkoxide composing the alfin catalyst are prepared by reaction of the sodium aluminum distearate slurry of the invention with the alcohol and the olefin in the presence of the dispersing liquid used for the catalyst. This can be and preferably is the same as the inert diluent used for the sodium dispersion. Frequently, however, a lower-boiling hydrocarbon such as hexane is used, to facilitate separation later. Any inert aliphatic or cycloaliphatic hydrocarbon is satisfactory.

The olefin is metallated by use of an alkyl sodium, the organic portion having from about three to about ten carbon atoms. Butyl chloride is preferred, but amyl chloride, hexyl chloride, hexyl bromide, heptyl chloride, amyl bromide, and octyl chloride can also be used.

The reaction will proceed at low temperatures, which is advantageous when the olefin is a gas, such as propylene. A temperature from about −20° to about +80° C. can be employed. From one to about five hours' reaction time is normally adequate.

The catalyst reaction mixture can be prepared by mixing the catalyst diluent, sodium-aluminum distearate dispersion and alkyl halide, and then adding the alcohol. After the alkoxide has been formed, the olefin is added and metallated. Excess olefin is removed, and the residue can be used as the alfin catalyst, without further treatment or purification. In this method, the sodium is first converted to the alkyl sodium, and half of this is then converted to the alkoxide, while the remainder is converted to alkenyl sodium.

It is also possible to add the alcohol to the sodium dispersion mixed with the catalyst diluent, forming the sodium alkoxide, and then adding the alkyl halide, and, fiinally, the olefin. This procedure requires hȧlf the amount of alkyl halide, and three-quarters the amount of sodium, required by the first procedure, and is therefore preferred in a commercial operation. This procedure is described in U.S. Patent No. 3,317,437, dated May 2, 1967, to Hoffman et al.

The alfin catalyst obtained will contain aluminum distearate or the sodium reaction product thereof, and because of the presence of the aluminum distearate, the alfin catalyst has an enhanced catalytic activity. Such aluminum distearate-containing alfin catalyst can be employed in the alfin polymerization of a wide variety of unsaturated organic compounds, including aliphatic dienes such as 1,3-butadiene, 2,3-dimethyl-1,3-butadiene, isoprene, piperylene, 3-methoxy-1,3-butadiene, aryl olefins such as styrene, the various alkyl styrenes, p-methoxystyrene, alpha-methyl-styrene, vinyl naphthalene, and other unsaturated hydrocarbons. 1,3-butadiene alone and combinations of butadiene and styrene or isoprene are preferred polymerizable unsaturated compounds, and the polymerization of these is particularly enhanced by the aluminum distearate-containing alfin catalysts prepared in accordance with this invention.

The amount of alfin catalyst (solids basis) that is employed for the alfin polymerization is normally from about 1 to about 5 weight percent, and preferably from about 1 to about 3.5 weight percent, based on the weight of the unsaturated organic compound.

The alfin polymerization reaction generally takes place at atmospheric pressure and room temperature in a suitable reaction medium. The pressure and temperature conditions are not critical, however, and the reaction will take place at any pressure within the range from about 1 to about 50 atmospheres and at any temperature within the range from about −25 to about +100° C.

Preferred reaction media are inert aliphatic and cycloaliphatic hydrocarbons, such as pentane, hexane, 1:1 mixture of hexane and pentane, octane, cyclohexane, cyclopentane, cycloheptane, Decalin, and heptane. A preferred reaction solvent is the hydrocarbon employed for the dispersion of sodium in the preparation of the alfin catalyst.

It is quite important that water be excluded from the alfin polymerization reaction mixture, and consequently it is essential that all components that eventually will be employed therein, including the solvent and aluminum distearate employed in the dispersion of the sodium, be anhydrous.

The polymerization reaction can be conducted in a batch-wise, semi-continuous, or continuous manner, and the polymers and copolymers obtained as reaction products can be recovered by any conventional technique.

In order to evaluate the activity of aluminum distearate-containing alfin catalysts in accordance with this invention, a standardized alfin catalyst preparation and alfin polymerization of butadiene were adopted, according to the following procedure:

PREPARATION OF ALFIN CATALYST

The preparation of the alfin catalyst employed in the examples was carried out as follows:

Dry hexane (465 parts) was charged to a 3-necked flask provided with a stirrer, inert gas sweep, and Dry Ice reflux condenser system. To this was added 13.8 parts (0.6 mole) of the finely-divided sodium dispersion containing from 0.5 to 4% aluminum distearate. To the stirred slurry of sodium particles there was added dropwise 12.1 parts (0.2 mole) of dry isopropanol over a period of 15 minutes during which time the temperature rose to about 40° C. After stirring for one hour, 18.9 parts (0.2 mole) of n-butyl chloride was added over a period of one-half hour during which time the temperature rose to about 50° C. Stirring was then maintained for an additional hour. Excess dry propylene (C.P. grade) was subsequently introduced into the mixture, the temperature of which was permitted to fall to 20° C. by means of an active reflux of liquefied propylene. The preparation was permitted to stand for eight hours with a propylene reflux before venting to remove excess propylene. The reactive slurry was transferred to a storage vessel and maintained under an atmosphere of inert gas. This alfin catalyst preparation (800 ml.) theoretically contains equimolar quantities of sodium isopropoxide, sodium chloride and sodium allyl. The preparation contains the equivalent of 0.00075 mole of total sodium compounds per milliliter or 0.00025 mole of the active sodium allyl.

ALFIN POLYMERIZATION OF BUTADIENE

To 105 parts of dry hexane was added 2.4 parts of 1,4-dihydrobenzene. Dry 1,3-butadiene was then dissolved in the hexane to about −10° C. Alfin catalyst was added in small increments to the butadiene-hexane solution until incipient polymerization occurred and the "working" catalyst was then added. The system was sealed and polymerization maintained at ambient temperature with intermittent shaking for about two hours. The system was then opened, and ethanol was added to destroy the catalyst and to precipitate the product, shredding the polymer using a Blendor apparatus. The product crumb was then washed intermittently with ethanol and water containing antioxidant to remove soluble inorganic residues (such as sodium isopropoxide and sodium chloride). The resulting insoluble material was wet, white solid polybutadiene. It was given a final wash with acetone containing an antioxidant, N-phenyl-2-naphthylamine, and then dried in an oven at 40° C. under vacuum.

The following examples in the opinion of the inventors represent preferred embodiments of their invention.

Examples 1 to 6

A number of sodium dispersions were prepared containing 0.5 to 5% aluminum distearate, using a laboratory Gaulin mill. The diluent used was Isopar C. 1560 grams (2250 cc.) of Isopar C was placed in the charging pot of a Gaulin mill, after suspending the desired amount of sodium charge of aluminum distearate in the diluent. This amounted to 0.03×454 or 13.6 grams, based on one pound of sodium charge for a 3% Na dispersion. The sodium charging port was then opened, and a one pound stick of sodium inserted, after which the port was closed. Nitrogen purge was then continued, to ensure a nitrogen atmosphere during the dispersion. The oil circulation pump was then turned on, and the temperature of the mill brought to 110° C. After heating for fifteen minutes the sodium had liquefied, and the Gaulin mill was then started, so that the temperature of the circulating solvent was maintained above 100° C., and nitrogen pressure was adjusted to 20 p.s.i. The mill was operated for a total time of fifteen minutes, after which time the sodium had been reduced to small particles with an average particle size of 1–2 microns in diameter. The dispersion was removed under nitrogen and cooled, after which it was used for the preparation of an alfin catalyst in accordance with the standardized procedure set out above, and this catalyst was then used (in the proportion set out below in Table I) in the standardized alfin polymerization of dry 1,3-butadiene.

In all, a total of six sodium dispersions were prepared, for demonstrating this invention following this procedure.

The results obtained in alfin polymerizations using catalysts prepared from these dispersions are given in Table I.

TABLE I

| Ex. No. | Amount of Al distearate, percent | Catalyst Ml. | (a)* | Butadiene G. | (a)* | Yield G. | Percent | Estimated Strength |
|---|---|---|---|---|---|---|---|---|
| 1 | 0.5 | 4.0 | (4) | 29.5 | (30) | 19.9 | 67.5 | 0.5 |
| 2 | 1.0 | 4.0 | (4) | 29.6 | (30) | 24.1 | 81.5 | 0.75 |
| 3 | 1.5 | 4.1 | (4) | 30.7 | (30) | 25.2 | 82.1 | 0.8 |
| 4 | 2.5 | 4.1 | (4) | 31.2 | (30) | 26.5 | 85.0 | 1.0 |
| 5 | 3.0 | 4.0 | (4) | 29.9 | (30) | 25.3 | 84.7 | 1.0 |
| 6 | 5.0 | 4.1 | (4) | 30.8 | (30) | 26.1 | 84.8 | 1.0 |

*This column represents a calculation of ml. of catalyst and grams of butadiene to a standard level of 30 g. of butadiene.

It is evident from this data that a good catalyst efficiency is obtained only when the amount of aluminum distearate is 2.5% or higher. Optimum results are obtained at 2.5 to 3% aluminum stearate.

Examples 7 to 17

A series of sodium dispersions was prepared following the procedure of Example 1, using an amount of aluminum distearate ranging from 2 to 3%. These sodium dispersions were then used in evaluating catalyst activity according to the standardized tests. The results obtained are given in Table II.

It is evident from the data that increasing the amount of aluminum distearate from 2 to 3% more reliably increased alfin catalyst activity.

TABLE II

| Ex. No. | Percent Aluminum Distearate | Catalyst Mo. | (a)[1] | Butadiene G. | (a)[1] | Yield G. | Percent | Estimated Strength [2] |
|---|---|---|---|---|---|---|---|---|
| 7 | 2 | 4.2 | (4) | 31.4 | (30) | 24.5 | 78.1 | 0.75 |
| 8 | 3 | 4.2 | (4) | 31.8 | (30) | 27.6 | 86.8 | 1.0 |
| 9 | 3 | 4.3 | (4) | 32.3 | (30) | 27.3 | 84.6 | 1.0 |
| 10 | 3 | 4.0 | (3) | 29.9 | (30) | 26.2 | 87.6 | 1.0 |
| 11 | 3 | 4.1 | (4) | 30.6 | (30) | 25.9 | 84.7 | 1.0 |
| 12 | 3 | 4.0 | (4) | 29.9 | (30) | 26.4 | 88.3 | 1.0 |
| 13 | 3 | 4.0 | (4) | 30.2 | (30) | 26.9 | 89.1 | 1.0 |
| 14 | 2 | 4.0 | (4) | 30.1 | (30) | 25.2 | 83.7 | 0.75 |
| 15 | 2 | 4.3 | (4) | 32.6 | (30) | 24.7 | 75.8 | 0.75 |
| 16 | 3 | 4.2 | (4) | 31.9 | (30) | 27.0 | 84.7 | 1.0 |
| 17 | 3 | 4.0 | (4) | 30.4 | (30) | 27.4 | 90.1 | 1.0 |

[1] This column represents a calculation of ml. of catalyst and grams of butadiene to a standard level of 30 g. of butadiene.
[2] A catalyst has been assigned a strength of 1.0 if 4 ml. will polymerize 30 grams of butadiene in two hours at 20 to 40° C. in an 85% yield after initial system cleanup.

Examples 18 to 20

A further series of sodium dispersions was prepared following the procedure of Examples 1 to 6 with the aluminum distearate being added to the dispersion after the initial milling, in some cases in the alfin catalyst reactor and in some cases before the reactor followed by remilling at 100° C. The results are compared in each example with like dispersions prepared without added aluminum distearate. The results obtained are given in Table III.

The Isopar E used had the composition:

| Component: | Weight percent |
|---|---|
| 2,2,4-trimethylpentane | 2.2 |
| 2,5-dimethylhexane; 2,4-dimethylhexane | 4.8 |
| 2,3,4-trimethylpentane | 11.5 |
| 2,3,3-trimethylpentane | 21.1 |
| 3-methylheptane | 33.0 |
| 2,2,4-trimethylhexane | 6.2 |
| 3-methyl-4-ethylhexane; 3,4-dimethylheptane; 2,3-dimethylheptane; 3,3,4-trimethylhexane | 5.7 |
| 15 other iso-components | 13.7 |
| $C_9$ naphtha+$C_{10+}$ | 1.8 |
| | 100.0 |

TABLE III

| Example No. | Wt. percent Al distearate added to 2% Al distearate dispersion | Dispersion Diluent | Catalyst Ml. | (a)[1] | Butadiene G. | (a)[1] | Yield G. | Percent | Estimated Strength | Remarks |
|---|---|---|---|---|---|---|---|---|---|---|
| 18a | None | Alkylate | 4.1 | (4) | 30.9 | (30) | 22.8 | 74.0 | 0.6 | Milled 15 minutes. |
| 18b | do | do | 4.4 | (4) | 33.0 | (30) | 27.6 | 83.6 | 0.8 | Remilled 15 minutes more. |
| 18c | 1% to lab mill | do | 3.9 | (4) | 29.6 | (30) | 24.4 | 82.4 | 0.75 | Remilled 15 minutes. |
| 19a | None | Isopar E | 4.0 | (4) | 30.2 | (30) | 23.1 | 76.6 | 0.6 | |
| 19b | 2% to reactor at room temperature. | do | 4.0 | (4) | 29.9 | (30) | 23.2 | 77.6 | 0.7 | No additional milling. |
| 19c | 1% to hot dispersion | do | 4.2 | (4) | 31.8 | (30) | 26.1 | 82.1 | 0.8 | Do. |
| 20a | None | Alkylate | 4.5 | (4) | 33.7 | (30) | 20.1 | 59.6 | 0.25 | |
| 20b | 2% to reactor | do | 4.0 | (4) | 29.8 | (30) | 23.1 | 77.5 | 0.7 | Reaction kept at regular temperature. |
| 20c | 2% to hot reactor | do | 4.3 | (4) | 32.1 | (30) | 25.4 | 79.1 | 0.75 | Reaction kept at 58-60° C. |

[1] This column represents a calculation of ml. of catalyst and grams of butadiene to a standard level of 30 g. of butadiene.

A comparison of the *a* runs with the *b* and *c* runs shows the improvement in the alfin polymerization when the catalyst contains in increased amount of aluminum distearate. Furthermore, a comparison with the runs in Examples 7 to 17 shows that the addition of aluminum distearate after the milling of the sodium gives virtually as good catalyst efficiency as adding the aluminum distearate prior to the sodium milling.

Examples 21 and 22

The effect of traces of water and alfin catalyst on sodium dispersions prepared following the procedure of Examples 1 to 6 with 2% and 3% aluminum distearate was studied. The sodium dispersons were employed in the preparation of standardized alfin catalysts and in standardized alfin polymerizations of butadiene. The results obtained appear in Table IV.

For comparison purposes, a number of other additives were tested by addition to the sodium dispersion before milling, to ascertain their effect on catalyst activity. These results are also set out in Table IV.

evaluated by the standardized tests. The following results were obtained:

TABLE V

| Ex. No. | Milling Time, Minutes | Catalyst ml. | (a)* | Butadiene G. | (a)* | Yield G. | Percent | Estimated Strength |
|---|---|---|---|---|---|---|---|---|
| 23 | 15 | 4.2 | (4) | 31.4 | (30) | 24.5 | 78.1 | 0.75 |
| 24 | 30 | 4.0 | (4) | 29.9 | (30) | 23.0 | 77.0 | 0.75 |
| 25 | 45 | 4.0 | (4) | 30.3 | (30) | 24.9 | 82.3 | 0.75 |
| 26 | 60 | 4.0 | (4) | 30.4 | (30) | 26.2 | 86.2 | 1.0 |
| 27 | 15 | 4.0 | (4) | 30.0 | (30) | 23.0 | 76.7 | 0.75 |

* This column represents a calculation of ml. of catalyst and grams of butadiene to a standard level of 30 g. of butadiene.

The results show that a longer milling time can be advantageous to catalyst activity for 2% aluminum distearate dispersions. However, with 3% dispersions, fifteen minute milling time is all that is required for maximum catalyst capacity.

TABLE IV

| Example No. | Additive | Catalyst Ml. | (a)[1] | Butadiene G. | (a)[1] | Yield G. | Percent | Estimated strength | Remarks |
|---|---|---|---|---|---|---|---|---|---|
| 21a | 2% Al distearate | 4.0 | (4) | 30.0 | (30) | 23.0 | 76.7 | 0.75 | Mill time, 15 min. in Isopar E. |
| 21b | 2% Al distearate +1 mol percent H₂O. | 4.0 | (4) | 29.9 | (30) | 21.6 | 72.3 | 0.50 | Added as vapor over entire milling time. |
| 21c | 2% Al distearate +200 ml. alfin catalyst. | 4.0 | (4) | 30.3 | (30) | 23.7 | 78.3 | 0.75 | Alfin added while milling. |
| 21d | 2% Al distearate | 4.2 | (4) | 31.7 | (30) | 25.5 | 80.4 | 0.75 | |
| 21e | 2% Al distearate +0.25 mol percent H₂O. | 4.0 | (4) | 29.8 | (30) | 23.4 | 78.5 | 0.75 | |
| 21f | 2% Al distearate +200 ml. alfin catalyst. | 4.0 | (4) | 30.1 | (30) | 25.1 | 83.4 | 0.75 | |
| 21g | 2% Al distearate | 4.0 | (4) | 29.9 | (30) | 24.2 | 80.9 | 0.75 | |
| 22 | 3% Al distearate | 4.2 | (4) | 31.8 | (30) | 27.6 | 86.8 | 1.0 | |
| Control: | | | | | | | | | |
| A | Dimer acid | | (2) | | | | | | Sodium agglomeration Emery Acid 461. |
| B | Buton resin | | (2) | | | | | | Sodium agglomeration Enjay Buton 100. |
| C | Zinc distearate | 4.4 | (4) | 33.2 | (30) | 20.1 | 60.6 | 0.25 | |
| D | "Ultrasil" high surface SiO₂ plus carbon black. | 4.0 | (4) | 30.4 | (30) | 21.5 | 70.8 | 0.5 | 1% of each. |
| E | 3.0% zirconium lactate | 4.0 | (4) | 30.4 | (30) | 21.0 | 69.2 | 0.5 | |

[1] This column represents a calculation of ml. of catalyst and grams of butadiene to a standard level of 30 g. of butadiene.
[2] Unable to prepare catalyst.

The tests show that large amounts of water are deleterious but that alfin catalyst is not. The improvement in catalyst efficiency obtained by the addition of of 3% aluminum distearate is evident from Example 22.

It is evident from the data that none of those tested is effective, even zinc distearate.

Examples 23 to 27

The effect of milling time of the sodium dispersion on catalyst activity was determined by preparing a number of sodium dispersions at milling times ranging from fifteen to sixty minutes. The diluent used was Isopar E. 2% aluminum distearate was used, and the procedure used was that of Examples 1 to 6. Catalyst activity was

Examples 28 to 32

A series of sodium dispersions was prepared, using Isopar E as the diluent, and 3% aluminum distearate. These dispersions were tested in the preparation of standardized alfin catalyst, and alfin polymerization of butadiene, with the following results:

TABLE VI

| Ex. No. | Percent Al distearate Found | Average Na Particle Size, μ | Catalyst Ml. | (a)[1] | Butadiene G. | (a)[1] | Estimated Strength |
|---|---|---|---|---|---|---|---|
| 28 | 2.5 | 1-2 | 4.0 | 4 | 29.9 | 30 | 1.0 |
| 29 | 2.9 | 1 | 4.0 | 4 | 29.9 | 30 | 1.0 |
| 30 | 3.2 | 1 | 4.0 | 4 | 30.6 | 30 | 1.0 |
| 31 | 3.0 | 1 | 4.0 | 4 | 30.1 | 30 | 1.0 |
| 32 | 2.8 | 3 | 4.0 | 4 | 29.9 | 30 | 1.0 |

[1] This column represents a calculation of ml. of catalyst and grams of butadiene to a standard level of 30 g. of butadiene.

It is evident from the data that all of these sodium dispersions containing 3% added aluminum distearate gave alfin catalysts of maximum activity.

Having regard to the foregoing disclosure, the following is claimed as the inventive and patentable embodiments thereof:

1. In the process for the preparation of alfin catalysts by reaction of a methyl n-alkyl carbinol, sodium, alkyl halide, and an olefin, the improvement which comprises employing as the source of soduim metal a dispersion of sodium in an inert diluent and containing from at least 1% to about 5% aluminum distearate by weight of the sodium.

2. A process in accordance with claim 1, in which the sodium has an average particle size within the range from about 0.5 to about 10 microns.

3. A process in accordance with claim 1, in which the sodium dispersion is formed in the presence of the aluminum distearate.

4. A process in accordance with claim 1, in which aluminum distearate is added to the sodium dispersion which is then heated at a temperature of at least about 50° C. to effect reaction between sodium and aluminum distearate.

5. A process in accordance with claim 4, in which the sodium dispersion is remilled after addition of the aluminum distearate.

6. A process in accordance with claim 1, in which the inert diluent is an aliphatic or cycloaliphatic hydrocarbon.

7. A process in accordance with claim 1, in which the dispersion of sodium contains at least about 2.5% aluminum distearate by weight of the sodium.

8. An alfin catalyst having an enhanced catalytic activity consisting essentially of an alkenyl sodium having from about three to about ten carbon atoms, a sodium alkoxide having from about one to about ten carbon atoms as the active catalytic ingredient, and aluminum distearate in an amount within the range from at least 1% to about 5% by weight of the sodium content of the catalyst.

9. An alfin catalyst in accordance with claim 8, in which the sodium alkoxide is sodium isopropoxide.

10. An alfin catalyst in accordance with claim 8, in which the alkenyl sodium is allyl sodium.

11. An alfin catalyst in accordance with claim 8, in which the aluminum distearate is present in an amount of at least 2.5% by weight of the sodium content of the catalyst.

12. A process for preparing alfin catalysts having an enhanced catalytic activity, which comprises reacting a dispersion in an inert diluent of sodium and from at least 1% to about 5% aluminum distearate by weight of the sodium content of the dispersion with a methyl n-alkyl carbinol having from one to about ten carbon atoms, an alkyl halide having from about three to about ten carbon atoms and an olefin having from about three to about ten carbon atoms to form a dispersion of an alkenyl sodium, sodium alkoxide, sodium halide and aluminum distearate in the inert diluent.

13. A process in accordance with claim 12, in which the reaction is carried out at a temperature within the range from about —20° C. to about 80° C.

14. A process in accordance with claim 12, in which the dispersion of sodium and aluminum distearate is mixed with an alkyl halide, the alcohol added and reacted therewith to form the sodium alkoxide, and then the olefin is added and reacted therewith to form the alkenyl sodium.

15. A process in accordance with claim 12, which comprises adding the alcohol to the dispersion of sodium and an aluminum distearate and forming the sodium alkoxide therein, adding an alkyl halide having from about three to about ten carbon atoms, and then adding the olefin and reacting the olefin with the sodium and alkyl halide to form the alkenyl sodium.

16. In the process for the preparation of alfin polymers by polymerization of an unsaturated organic compound in the presence of an alfin catalyst, the improvement which comprises using an alfin catalyst consisting essentially of an alkenyl sodium having from about three to about ten carbon atoms, a sodium alkoxide having from about one to about ten carbon atoms as the active catalytic ingredient, and aluminum distearate in an amount within the range from at least 1% to about 5% by weight of the sodium content of the catalyst.

17. A process in accordance with claim 16, in which the unsaturated organic compound is selected from the group consisting of an aliphatic diene and an aliphatic diene in admixture with a copolymerizable olefin.

18. A process in accordance with claim 16, wherein the reaction solvent is the hydrocarbon employed for the dispersion of sodium employed in the preparation of the alfin catalyst.

References Cited

UNITED STATES PATENTS

| | | | |
|---|---|---|---|
| 3,317,437 | 5/1967 | Hoffman et al. | 252—431 |
| 3,380,984 | 4/1968 | Birchall et al. | 260—94.2 |

JOSEPH L. SCHOFER, Primary Examiner

J. C. HAIGHT, Assistant Examiners

U.S. Cl. X.R.

252—431; 260—80.7, 83.7, 85.3, 93.5, 94.2